United States Patent [19]
Terai

[11] Patent Number: 5,877,101
[45] Date of Patent: Mar. 2, 1999

[54] GLASS-CERAMIC COMPOSITE

[75] Inventor: Katuya Terai, Tokyo, Japan

[73] Assignee: NEC Corporation, Japan

[21] Appl. No.: 794,210

[22] Filed: Jan. 30, 1997

[30] Foreign Application Priority Data

Jan. 31, 1996 [JP] Japan ..................... 8-015292

[51] Int. Cl.$^6$ ............. C03C 14/00; C03C 10/04
[52] U.S. Cl. ................ 501/32; 501/5; 501/6; 501/7
[58] Field of Search ............. 501/5, 32, 6, 7

[56] References Cited

U.S. PATENT DOCUMENTS 5,256,469  10/1993  Cherukuri et al. ............. 428/210
5,525,855   6/1996  Gotoh et al. .................... 501/32

FOREIGN PATENT DOCUMENTS 595644    5/1994   European Pat. Off. .
2-105710  4/1990   Japan .
6-191887  7/1994   Japan .
995212   11/1963   United Kingdom .

OTHER PUBLICATIONS

"Quartz Oscillator Applicable for Surface Mounting", Electronics Update, 1990–4, pp. 83–85.
*Patent Abstracts of Japan*, vol. 018, No. 209, Apr. 13, 1994 & JP 06 009245 A, Jan. 18, 1994.
*Patent Abstracts of Japan*, vol. 014, No. 320, Jul. 10, 1990 & JP 02 105710 A, Apr. 18, 1990.
*Chemical Abstracts*, vol. 109, No. 12, Sep. 19, 1888 & JP 63 107 838 A, May 12, 1988.

*Primary Examiner*—Karl Group
*Attorney, Agent, or Firm*—Ostrolenk, Faber, Gerb & Soffen, LLP

[57] ABSTRACT

A glass-ceramic composite which has forsterite in an amount of 40 to 60% by weight is included in crystallized glass having a coefficient of thermal expansion of 100° to 200× $10^{-7}/°C$. is used to configure a package, to the electrode pads of which a quartz crystal is directly soldered, without any supporting material. A quartz crystal piece is included within a flat package that use a glass-ceramic composite according to the present invention, thereby greatly limiting the variation in resonance characteristics with respect to heat treating done when the package is sealed, as compared to previous packages.

4 Claims, 6 Drawing Sheets

◆ Present invention
○ Conventional product

FIG.8

GLASS-CERAMIC COMPOSITE

BACKGROUND OF THE INVENTION

1. Field of the Invention

The present invention relates to a glass-ceramic compound having a coefficient of thermal expansion that nearly coincides with that of quartz and to a a high-reliability of a flat-package for surface mounting of piezo-electric devices such as a quartz oscillator or a surface-acoustic wave resonator (SAW).

2. Description of the Related Art

Figure 4:
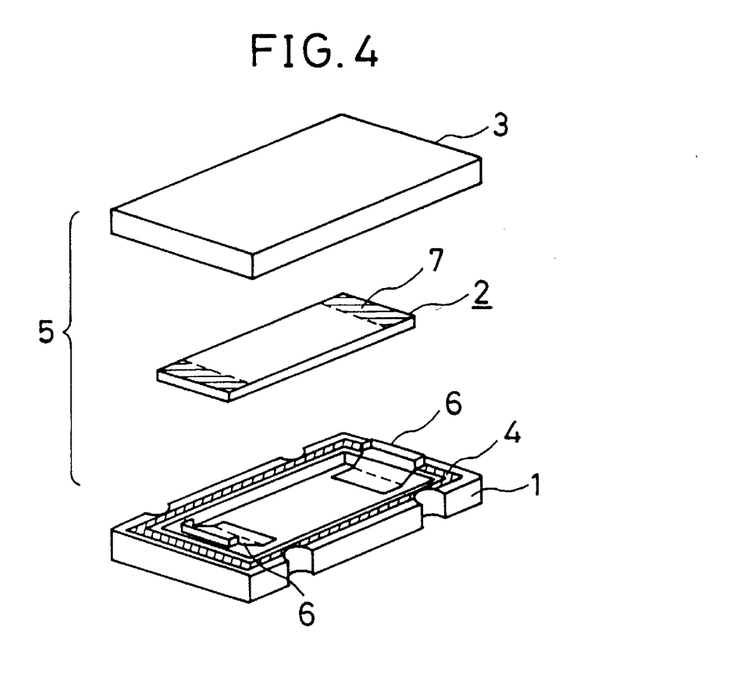
FIG. 4 is an exploded perspective view of a quartz oscillator using a ceramic package of the past.

When using such devices as quartz resonators as surface-mounted devices, as shown in FIG. 4, after affixing a quartz crystal 2 onto a base material 1 having alumina as its principal material, a cap 3 having alumina as its principal material is mounted thereover, after which hermetic sealing is done with a glass seal 4 having a low melting point. The sealed package 5 is mounted to a circuit board by means of, for example, the solder reflow method.

When sealing the package or when mounting these devices to a circuit board, the package is subjected to heat, and because the coefficients of thermal expansion of the package 5 and the quartz crystal 2 differ, after heating and cooling strain occurs in the quartz crystal 2. For this reason, the resonant frequency of the quartz crystal 2 changes, making it impossible to obtain the desired frequency characteristics.

As a countermeasure to this problem, a construction such as shown in FIG. 4, for example, which was described in "ELECTRONICS UPDATE" (p. 83 to p. 88 of Issue No. 4 in 1990) is used, in which the quartz crystal 2 is affixed to the base material 1 via a springy supporter 6, after which sealing is done.

Figure 5:
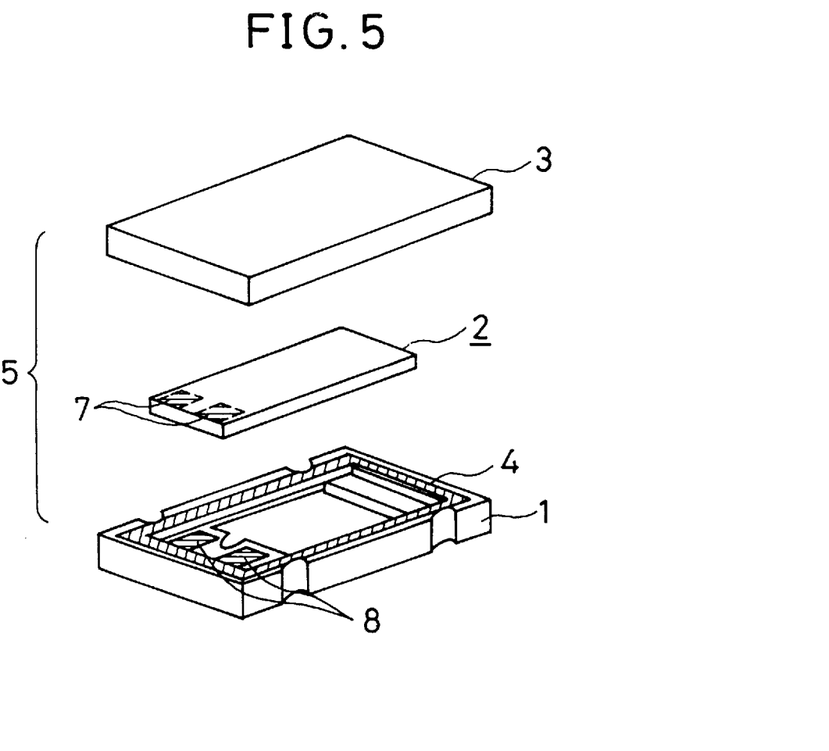
FIG. 5 is an exploded perspective view of another quartz oscillator using a ceramic package of the past.

Another method is that disclosed in Japanese Unexamined Patent Publication (KOKAI) No. 2-105710, wherein the electrode leads 7 of the quartz crystal 2 are lead out to the same edge part of the quartz crystal 2, quartz crystal 2 being directly affixed to the base material 1 by fixing it to an electrode pad part 8 without an intervening supporter.

However, because with a quartz oscillator element such as noted above the coefficients of thermal expansion of the package 5 and the quartz crystal 2 differ from each other (for example, 70 to $80 \times 10^{-7}/°C$. for alumina and $139 \times 10^{-7}/°C$. for the quartz crystal (Z long cut)), after heating and cooling, strain occurs, causing a change in the resonant frequency of the quartz crystal and preventing the achievement of the desired frequency characteristics.

Solving the above-noted problem by connecting the quartz crystal 2 to the package 5 via a springy supporter 6 is accompanied by an increase in the manufacturing cost and results in a package 5 with increased thickness.

In addition, alumina (Al2O3), which is the principal material of the package 5 has a sintering temperature in the range 1500° to 1600° C., so that when simultaneously heat-forming the wiring conductors within the package 5, it is necessary to use a high melting point metal such as tungsten (W) or Molybdenum (Mo) for the conductors.

Because the electrical conductivity of such high melting point metals is low, and because they cannot be soldered, it is necessary to provide a plating of Nickel (Ni) or Gold (Au). For this reason, a large number of steps and a high cost are involved in manufacture.

On the other hand, as one of other method to solve this conventional problems, Japanese Unexamined Patent Publication (KOKAI) No. 6-191887 is known.

This prior art discloses a glass-ceramic composite wherein 30 to 70% forsterite by weight are dispersed in crystallized glass and further it also discloses a method for making a flat package type piezo-electric devices comprising a quartz oscillator by forming the package made of the crystallized glass with mixing a plurality of specifically selected composing elements under specific mixing ratio, respectively.

However, in this prior art, the coefficients of thermal expansion of an element of the crystallized glass is at most around $120 \times 10^{-7}/°C$. and thus there is a significant difference between the coefficients of thermal expansion of the crystallized glass and that of the quartz oscillator having the coefficients of thermal expansion of $139 \times 10^{-7}/°C$.

Further, in a specific embodiment of this prior art, although crystallized glass portions each having the coefficients of thermal expansion of $129 \times 10^{-7}/°C$. and of $135 \times 10^{7}/°C$., respectively, the bending resistance of each thereof is relatively low and since each of the crystallized glass in this embodiments contains relatively large amount of sodium components therein, another problem will be raised in that it generally has deteriorated anti-moisture characteristic.

Accordingly, in this prior art, it would be difficult to produce a glass-ceramic compound having a coefficients of thermal expansion being substantially identical to that of quartz oscillators and having high-level of bending resistance and anti-moisture characteristic.

SUMMARY OF THE INVENTION

The present invention was conceived for the purpose of solving the above-noted problems and to provide a package material that has a coefficient of thermal expansion that is close to that of a quartz slab or other piezo-electric components, and further provides a glass-ceramic composite having high-level of bending resistance and anti-moisture characteristic.

Therefore, to attain the above-mentioned object of the present invention, the glass-ceramic composite of the present invention is characterized in that the glass-ceramic composite which contains at least phosphorus component therein, and which includes 40 to 60% forsterite by weight.

Further, the glass-ceramic composite of the present invention is characterized in that the phosphorus component exists in said crystallized glass to form crystallized core and the phosphorus component used in the present invention and forming the crystallized glass is preferably $P_2O_5$.

In a first aspect of a glass-ceramic composite of the present invention, it can preferably formed from several kinds of components with specific mixing rate, respectively, for example, the composition by percentage of weight of said crystallized glass is 70 to 86 of $SiO_2$, 1 to 10 of $P_2O_5$, 1 to 5 of MgO, and 8 to 22 of $R_2O$ (wherein R is at least one element selected from the group consisting of Li and K).

While, In a second aspect of a glass-ceramic composite of the present invention, it can preferably formed from several kinds of components with specific mixing rate, respectively, for example, the composition by percentage of weight of said crystallized glass is 40 to 55 of $SiO_2$, 20 to 30 of $Al_2O_3$, 1 to 20 of $P_2O_5$, 1 to 5 of BaO, 1 to 10 of $Na_2O$ and 1 to 5 of $R_2O$ (wherein R is at least one element selected from the group consisting of Li and K).

Yet another feature of the present invention is that P forms a quartz crystal cores on the above-noted glass, and that a fine powder mixture of glass and forsterite having a mean grain diameter of 0.1 to 3 $\mu$m is formed.

Another feature of the present invention is that it is a package which uses the a glass-ceramic composite having the above-noted composition.

An addition feature is that, as a flat-package type of piezo-electric device, the present invention comprises a quartz crystal onto which are disposed electrode leads, a base material which has a pair of electrode pads that are both electrically and mechanically connected to the above-noted quartz crystal, and a cap material, the above-noted base material and cap material being formed using a glass-ceramic composite as noted above.

DESCRIPTION OF THE PREFERRED EMBODIMENTS

A glass-ceramic composite according to the present invention features a form in which 40 to 60% (by weight) of forsterite (2 MgO·SiO2) is distributed within the crystallized glass which contains at least phosphorus component therein as a core component, the above-noted crystallized glass itself preferably having a coefficient or ratio of thermal expansion of $100°$ to $200 \times 10^{-7}/°C.$, and a glass composition based on oxides being selected from the above-mentioned compositions.

Because this glass-ceramic composite, by virtue of the mutual action between the glass and the forsterite, has a coefficient of thermal expansion that is the same as or as value close to the coefficient of thermal expansion of a piezo-electric component such as quartz, by making the package from this material, it is possible to control variation in the resonant frequency of the component with direct mounting of the quartz slab or other piezo-electric component without an intervening support element.

The composition and characteristics of a glass-ceramic composite according to the present invention are shown in Table 1, which shows the results of 16 embodiments. The coefficient of thermal expansion of glass itself is also shown in Table 1.

In each of the embodiments, the glass components and forsterite (2 $MgO \cdot SiO_2$) powder were mixed as a powder using a wet-type ball mill, to obtain a fine powder having a mean grain size of 0.1 to 3 $\mu m$, which after drying was formed by a powder press, and sintered at 800° to 1000° C. in the atmosphere for 1 to 2 hours, after which the coefficient of thermal expansion and resistance to bending were measured.

Figure 2:
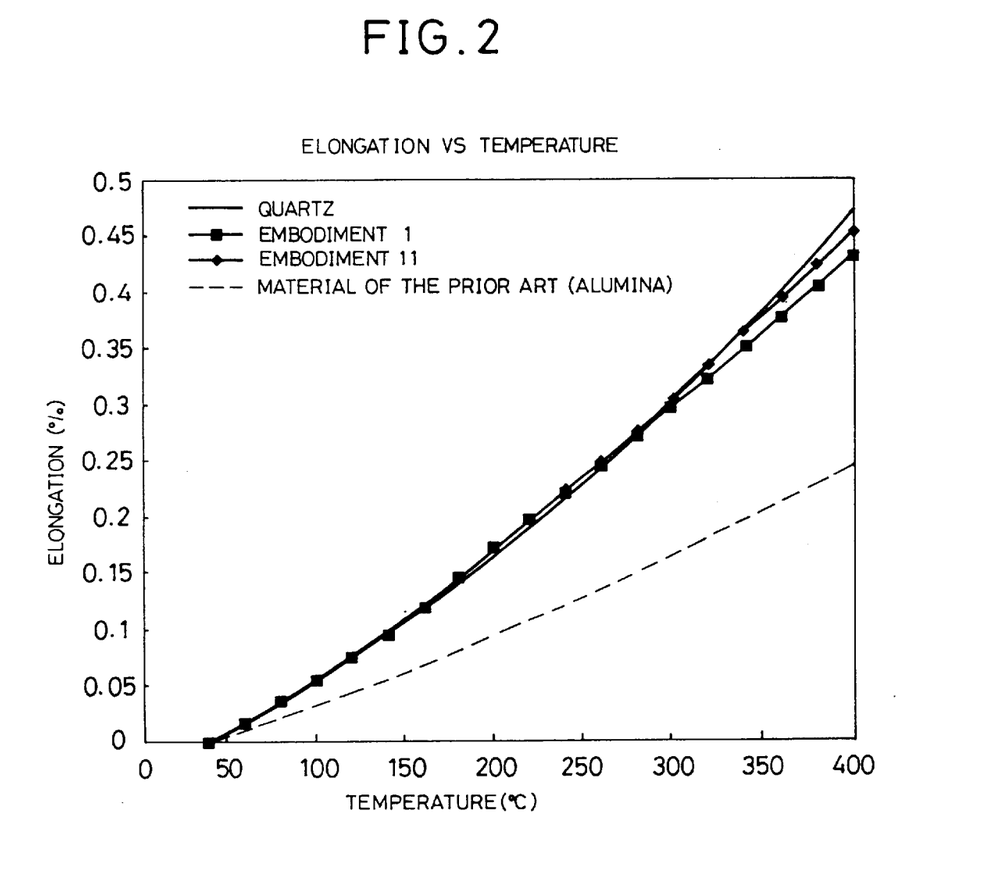
FIG. 2 is a drawing which shows a comparison of the expansion with change in temperature between a material of the past and a glass-ceramic composite according to a first embodiment of the present invention.

The results are shown in Table 1. With regard to the compositions of the first and the eleventh embodiments in particular, FIG. 2 shows a comparison with a material of the conventional product with regard to thermal expansion. The compositions of the present invention exhibit expansion that is nearly the same as quartz, thus verifying that they represent a great improvement over the compositions of the conventional product.

The compositions of the first to the ninth embodiments, which show the embodiments relating to the first aspect of the present invention, can be distinguished as a first group of glass-ceramic composites having a forsterite of 40 to 60% by weight with respect to a lithium-type crystallized glass (the glass itself having a coefficient of thermal expansion of 110° to $160 \times 10^{-7}/°C.$), the glass composition (by percentage weight) being 70 to 86 $SiO_2$, 1 to 10 $P_2O_5$, 1 to 5 MgO, and 8 to 20 $R_2O$ (where R is one or more from the group Li and K).

TABLE 1

Glass-Ceramic composite Compositions and Characteristics

| Example | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Compsition of Glass | $SiO_2$ | 80 | 75 | 82 | 86 | | 78 | | 70 | 84 | | 50 | | 55 | 40 | 55 | 45 |
| | $Al_2O_3$ | 0 | 0 | 0 | 0 | | 0 | | 0 | 0 | | 30 | | 24 | 30 | 20 | 22 |
| | $Na_2O$ | 0 | 0 | 0 | 0 | | 0 | | 0 | 0 | | 5 | | 10 | 10 | 1 | 5 |
| | $R_2O$ | 11 | 14 | 11 | 8 | | 16 | | 22 | 11 | | 5 | | 5 | 1 | 5 | 3 |
| | $P_2O_5$ | 8 | 10 | 6 | 1 | | 4 | | 3 | 2 | | 9 | | 1 | 18 | 15 | 20 |
| | BaO | 0 | 0 | 0 | 0 | | 0 | | 0 | 0 | | 1 | | 5 | 1 | 4 | 5 |
| | MgO | 1 | 1 | 1 | 5 | | 2 | | 5 | 3 | | 0 | | 0 | 0 | 0 | 0 |
| Compsition Ratio | glass | 50 | 50 | 50 | 50 | 40 | 50 | 60 | 50 | 50 | 50 | 55 | 60 | 50 | 50 | 50 | 50 |
| | Forsterite | 50 | 50 | 59 | 50 | 60 | 50 | 40 | 50 | 50 | 50 | 45 | 40 | 50 | 50 | 50 | 50 |
| Characteristic | Coeff. of therm. expan. | 129 | 135 | 125 | 115 | 115 | 120 | 125 | 120 | 118 | 135 | 140 | 144 | 142 | 132 | 133 | 143 |
| | Bending resistance | 3800 | 2800 | 3300 | 2800 | 2500 | 2800 | 2700 | 2600 | 2500 | 3100 | 3000 | 2500 | 2900 | 2500 | 3000 | 2500 |
| coefficients of thermal expansion of Glass | | 158 | 166 | 145 | 135 | 140 | 140 | 140 | 135 | 132 | 175 | 175 | 175 | 177 | 160 | 163 | 190 |

This glass-ceramic composite has a coefficient of thermal expansion of approximately 115° to 135×10$^{-7}$/°C., which although is a little bit smaller than the 139×10$^{-7}$/°C. of quartz (Z long cut), is quite close thereto, this being a prominent improvement over alumina (with a coefficient of thermal expansion of 70° to 80×10$^{-7}$/°C.) of the conventional product. By virtue of glass crystallization and the creation of a fine powder of the component materials, almost all of the compositions had a high bending resistance of 2500 to 3800 kg/cm2, making them suitable for use as a package material.

Turning now to the compositions of the tenth to the sixteenth embodiments, these compositions, which show the embodiments relating to the second aspect of the present invention, can be distinguished as a second group of glass-ceramic composites having forsterite of 40 to 60% by weight with respect to a silica-alumina soda type crystallized glass (the glass itself having a coefficient of thermal expansion of 170° to 200×10$^{-7}$/°C.), the glass composition (by percentage weight) being 40 to 55 $SiO_2$, 20 to 30 $Al_2O_3$, 1 to 20 $P_2O_5$, 1 to 5 BaO, 1 to 5 $R_2O$ (where R is one or more of the group Li and K).

This silica-alumina soda type glass has a low sintering temperature and a high coefficient of thermal expansion compared with the above-noted lithium-type glass. The coefficient of thermal expansion of this glass-ceramic composite is 135° to 144×10$^{-7}$/°C., which closely coincides with the 139×10$^{-7}$/°C. of quartz (Z long cut), this being a superior material not available in the conventional product.

By virtue of glass crystallization and the creation of a fine powder of the component materials, almost all of the compositions had a high bending resistance of 2500 to 3100 kg/cm$^2$, making them suitable for use as a package material.

A feature of a glass-ceramic composite according to the present invention is that, in spite of having either the same or nearly the same coefficient of thermal expansion as quartz, it has a bending resistance close to that of alumina used in the conventional product.

This result is by virtue of the selection of the glass composition, the inclusions of forsterite, and the use of $P_2O_5$, for example. By including an appropriate amount of $P_2O_5$ in the glass composition, the $P_2O_5$ becomes a core after going through the sintering process, the glass components being crystallized and the strength thereof being improved.

For this reason, $P_2O_5$ is an essential component in the present invention. If the amount by percentage weight of forsterite with respect to the glass components falls outside range of 40 to 60%, air bubbles occur in the glass during the sintering stage, this causing the problem of not being able to achieve the important property of bending resistance.

Figure 6:
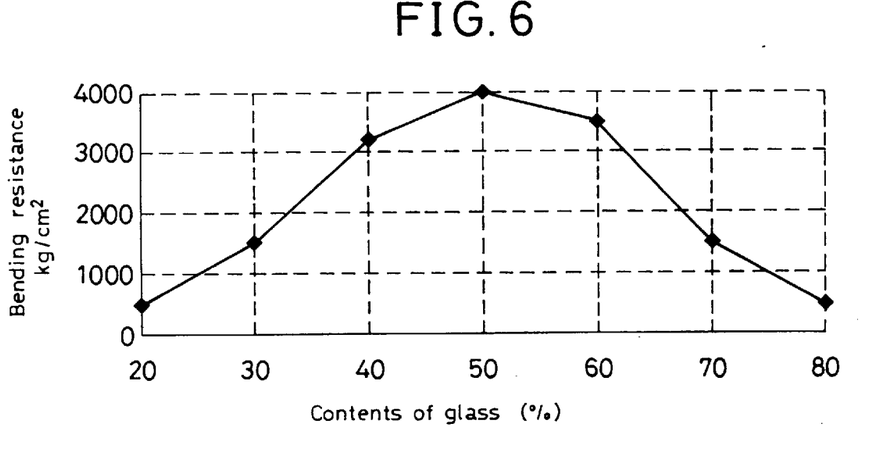
FIG. 6 shows a graph indicating a relationship between the content amount of glass contained in the glass-ceramic composite and the bending resistance.

Among a lots of different kinds of characteristics of the glass-ceramic compound as used for a flat package type piezo-electric device, a relationship between the content amount of glass contained in the glass-ceramic composite and the bending resistance, was especially reviewed by the inventors and the results of the review is shown in FIG. 6.

As shown in FIG. 6, when the content of the glass is less than 40%, a surface of the ceramic compound cannot sufficiently fit with the glass and thus a content of pores is increased and accordingly necessary hermetical seal cannot be secured causing bending resistance of this glass-ceramic compound to be lowered.

On the other hand, when the content of the glass exceeds over 60%, the bending resistance of the glass-ceramic compound is lowered because of the content ratio of ceramics forming a frame of the compound, being small and at the same time, as the content ratio of the glass in the compound is too much, for example, exceeding 80% or the like, when a box type package should be formed, each of the corner thereof is rounded and thus the box type package cannot be produced.

However, in the glass-ceramic compound of the present invention, since it is preferably desired that the bending resistance thereof exceeds 3000 kg/cm$^2$, it can be determined that the content ratio of the glass in the glass-ceramic compound in the present invention, is preferably 40 to 60% and accordingly the content ratio of the forsterite being preferably 40 to 60%.

While, in the present invention, it was found that in order to attain the objects of the present invention, the inclusion of phosphorus component into the glass component which should be mixed with the forsterite, is very important and further it is also found that the phosphorus component as used in the present invention, should be $P_2O_5$.

Further, in the present invention, it is also found that when the phosphorus component exists inside and at a center portion of the crystallized glass as a core component, this fact gives the glass-ceramic compound sophisticated advantages.

When the glass-ceramic compound of the present invention had been compared with a conventional glass-ceramic compound as disclosed in the Japanese Unexamined Patent Publication (KOKAI) No. 6-191887, in the conventional glass-ceramic compound, it is characterized in that the phosphorus component was not used at all but a large amount of sodium component ($Na_2O$), for example, 22 weight % or the like, is used.

Comparing to this, in the present invention, it is apparently characterized in that the phosphorus component is used and additionally in one embodiment, lithium component (Li) or potassium component (K), and magnesium component (Mg) are parallely used or in another embodiment, aluminium component (Al), barium component (Ba), sodium component (Na) and lithium component (Li) or potassium component (K) are parallely used additionally.

The differences in the components between the glass-ceramic compound of the present invention and that of the conventional product and the effects obtained by each of the glass-ceramic compounds are disclosed in Table 2.

As understood from Table 2, the bending resistance of the conventional glass-ceramic compound, shows 3200 kg/cm$^2$ keeping so called desired level, in any way, but the coefficients of thermal expansion thereof shows 118×10$^{-7}$/°C., the level of which being far below the desired value thereof.

Figure 8:
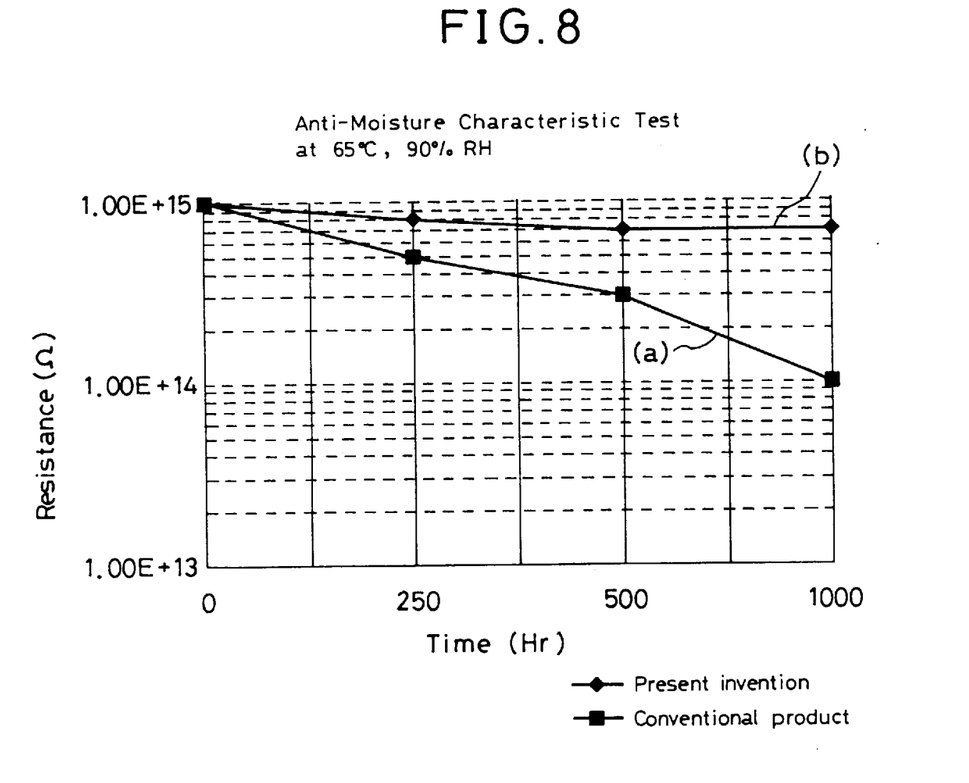
FIG. 8 shows graphs indicating a change of anti-moisture characteristic of the glass-ceramic composite of the present invention and of the conventional glass-ceramic composite, with respect to time elapsed.

Further, as shown by a line (a) in FIG. 8, in accordance with the results of the anti-moisture test with respect to insulation resistance of the conventional glass-ceramic compound, since it includes a relatively large amount of sodium component, the resistance value is gradually reduced as time for using same elapses.

Therefore, it can be understood that the conventional glass-ceramic compound is seemed to be not good for practical use.

On the other hand, as shown by a line (b) in FIG. 8, the glass-ceramic compound of the present invention, the insulation resistance is not changed with respect to the elapsed time and thus it can be understood that the glass-ceramic compound of the present invention can be practically used for long time.

Note that, comparing with the conventional glass-ceramic compound, in the present invention, the bending resistance of the glass-ceramic compound can be improved and the coefficients of thermal expansion thereof can be coincided with that of the quartz oscillator by adding the phosphorus component to the crystallized glass and further the glass-ceramic compound having superior anti-moisture characteristic, can be obtained.

Figure 7:
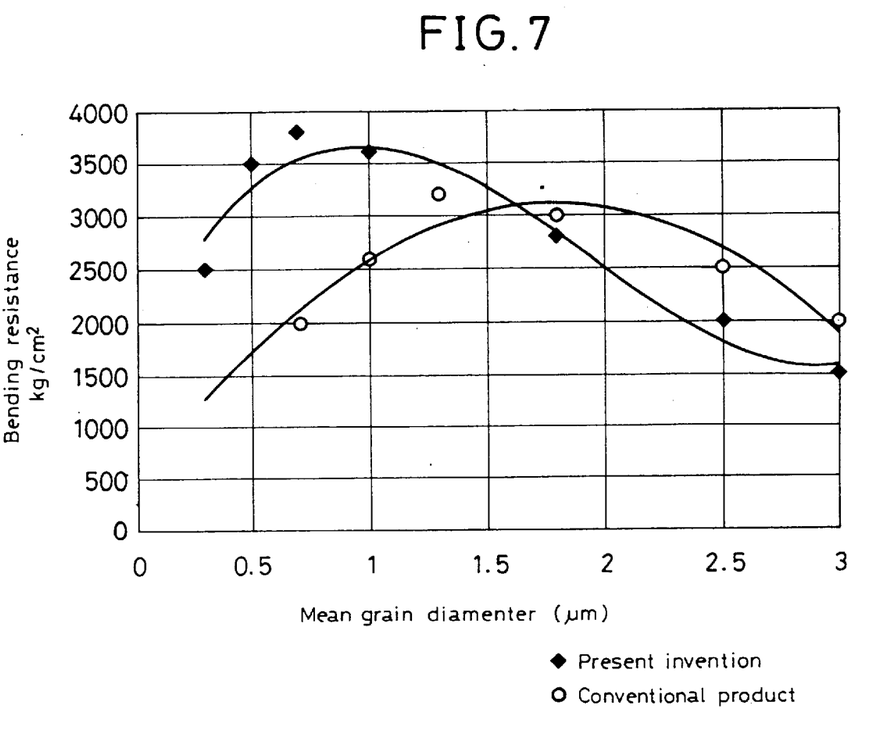
FIG. 7 shows graphs indicating a relationship between a mean grain diameter of the glass and the forsterite and the bending resistance.

FIG. 7 shows a relationship between a mean grain diameter of the glass and the forsterite and the bending resistance of the glass-ceramic compound of the present invention and that of the conventional glass-ceramic compound.

As apparent from FIG. 7, the bending resistance of the glass-ceramic compound formed by the crystallized glass having specifically components as defined by the present invention and the forsterite, shows the maximum value when the mean grain diameter of the glass and the forsterite are about 0.5 to 1.5 μm.

However, in the conventional glass-ceramic compound, the bending resistance thereof shows the maximum value when the mean grain diameter of the glass and the forsterite are about 1.5 to 2.5 μm.

Accordingly, in the present invention, since the glass-ceramic compound can be made by grains of the glass and the forsterite having smaller diameter than that used in the conventional glass-ceramic compound, the improved bending resistance, uniformity in the above-mentioned characteristics and simplified glass-ceramic compound producing process can be obtained.

In the above-noted first group of compositions, if the proportion by weight of $P_2O_5$ exceeds 10%, phase separation occurs, and a stable glass cannot be obtained, and if the amount is less than 1%, crystallization insufficient.

For the purpose of improving the insulation resistance in the presence of moisture, i.e., anti-moisture resistance, it better to have a small amount of $Na_2O$, it being desirable not to be used in the glass-ceramic compound.

Additionally, MgO is a component which imparts fusability to the glass, and if the amount thereof is too great, a problem can occur because the crystallization of the glass will be inhibited, making it desirable that the amount be 1 or more than 1% and no greater than 5% by weight. $SiO_2$, $Li_2O$, $K_2O$ and the like are components which form the skeleton of the glass, and it is necessary to select these components with consideration given to the coefficient of thermal expansion, fusability, and the crystallization of the glass. According to experimental results, it is desirable that the amount of $SiO_2$ be 70 to 86% by weight, an amount greater than this preventing the achievement of the required coefficient of thermal expansion, and an amount less than this causing poor fusability. The amount of $R_2O$ (where R is Li, K or the like) should be 8 to 20% by weight, an amount greater than this causing a drop in the coefficient of thermal expansion of the glass, and an amount less than this causing poor fusability.

In the above-noted second group of compositions, $SiO_2$, $Al_2O_3$ and $R_2O$ are components that form the skeleton of the glass, the desirable ranges of these components being as noted above. If these ranges are exceeded, problems such as crystallization not progressing, poor fusability, and lack of the ability to achieve the required coefficient of thermal expansion will occur.

BaO is a component that imparts fusability, and it is desirable that the amount thereof be in the range 1 to 5% by weight. An amount greater than this will cause the problem of crystallization not progressing. $P_2O_5$ is a component which forms the crystal nucleus, the desirable amount in the second group of compositions being 1 to 20% by weight. If the amount exceeds 20% by weight, phase separation will occur, making it impossible to achieve a stable glass. The lower limit value is 1% by weight, and an amount less than this will cause insufficient glass crystallization, resulting in insufficient strength.

Further, it is desirable that the amount of $Na_2O$ is 1 to 10% by weight and the amount of $Li_2O$ or $K_2O$ is 1 to 5% by weight.

In this manner, if the amounts of the various components in the first and second group of compositions falls outside those noted above, it is extremely difficult to achieve a glass-ceramic composite which has both a coefficient of thermal expansion that is nearly the same as or close to that of quartz and the strength and resistance to moisture required for practical use.

Figure 1:
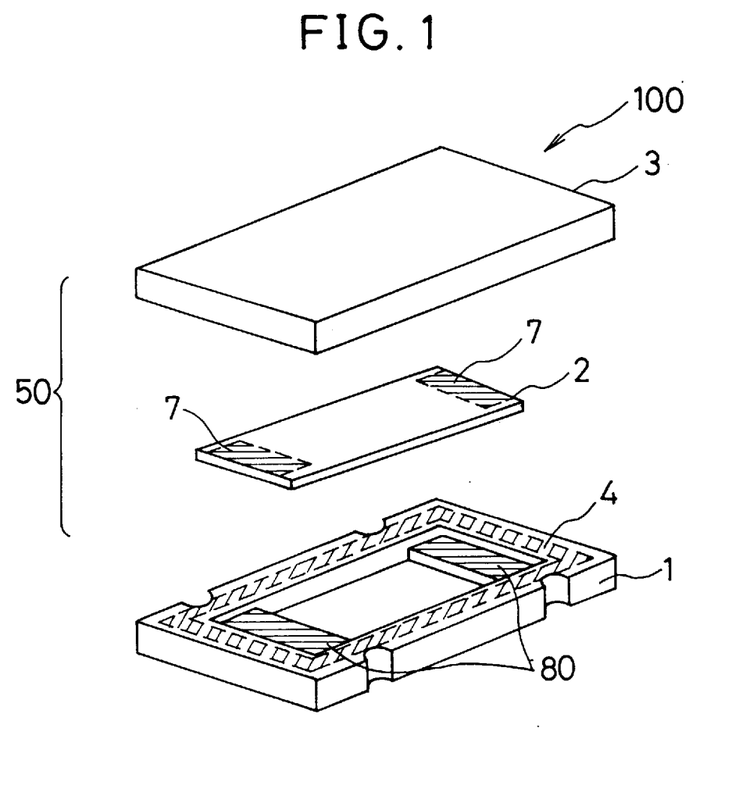
FIG. 1 is an exploded perspective view of a flat-package quartz crystal resonator which uses a glass-ceramic composite according to an embodiment of the present invention.

FIG. 1 shows one embodiment of a flat package type quartz oscillator 100 of the present invention which is made of the glass-ceramic compound formed by the present invention as explained above, and which comprises a package 50 comprising a quartz crystal piece 2 onto which are located electrode leads 7, a base material 1 having a pair of electrode pad parts 80 which are both electrically and mechanically connected to said electrode leads 7 of said quartz crystal piece 2, and a cap part 3.

Next, a flat package 100 which uses a glass-ceramic composite having mean grain diameter of 0.1 to 1.5 μm, according to the present invention will be described. Using a raw material powder indicated by the first and the eleventh embodiments shown in Table 1, a package was fabricated having a construction that is equivalent to packages in the conventional product, by following the manufacturing steps given below.

(a) The above-noted raw material, a binder and a solvent are mixed to make a slurry, and the doctor blade method is used to form a green sheet having a thickness of 100 to 300 μm.

(b) A through hole is formed in the above-noted green sheet, Ag/Pd paste is screen printed, which fills the through hole and forms an internal conductor part.

(c) On a separate green sheet Ag/Pd paste is screen printed, and the external readout electrodes are formed.

(d) On a separate green sheet, a hole for use as a cavity for the quartz element is punched.

(e) The above-noted green sheets (b) through (d) are laminated together, and are pressed at a pressure of 200 to 400 kg/cm$^2$ at a temperature of 80° C.

(f) The above-noted laminate is de-bindered, and heat formed at a temperature of 800° to 1000° C.

(g) The heat-formed laminate is cut to obtain the base material 1 as of the package as shown in FIG. 1.

(h) Using the same powder mixture as the base material 1, a cap material for the package is formed using a powder press, and is heat formed at 800° to 1000° C. to obtain the cap material 3.

(i) Onto the above-noted base material 1 is formed a low-melting-point glass sealing part 4, and after affixing the electrode pad pa 80 and the electrode lead part 7 of the quartz crystal 2 onto the above-noted base material 1 in the configuration shown in FIG. 1, using an electrically conductive adhesive, the above-noted cap material 3 is used to perform sealing, this completing the fabrication of the quartz oscillator package 50.

An investigation was performed to compare the temperature dependency of the resonant frequency of the completed quartz oscillator to that of one of the conventional product. First, the resonant frequency (fO) of each was measured using a spectrum analyzer.

Next, 10 each of each type were heated for approximately 30 minutes to temperature of 100° C., 200° C., 300° C., and 400° C., after which they were cooled to room temperature, the resonant frequencies f(T) thereof being measured after this thermal treatment, and Δf/fO being calculated by means of Equation 1.

Equation 1

Δf/fO={(F(T)−fO)/fO} ((Resonant frequency after thermal treatment)−(Resonant frequency before thermal treatment))/(Resonant frequency before thermal treatment)

Figure 3:
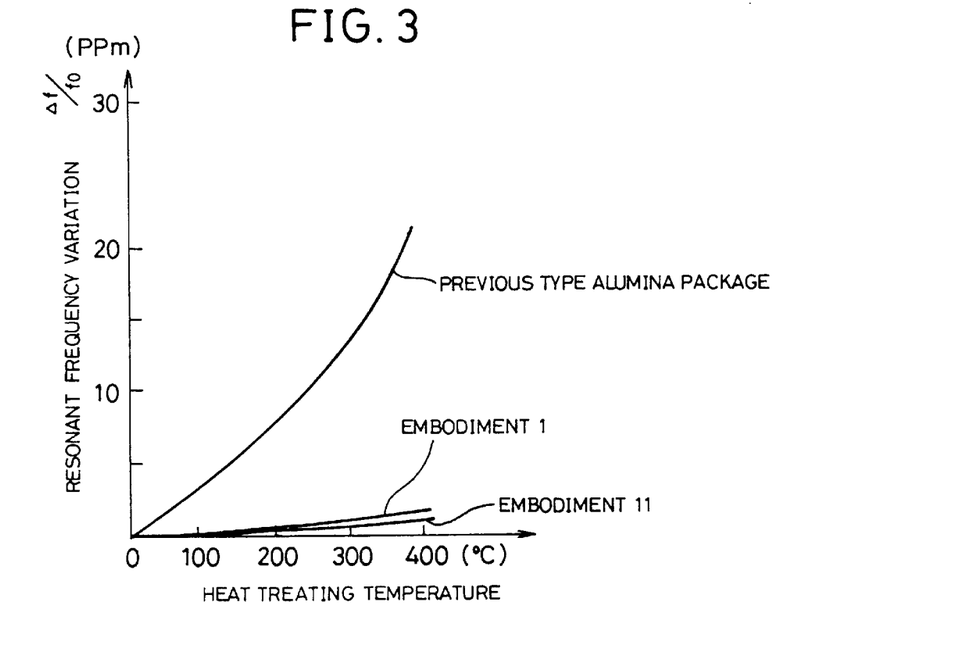
FIG. 3 is a drawing which shows a comparison of the temperature characteristics of the resonant frequency between a flat-package quartz oscillator using a material of the past and one using a glass-ceramic composite according to a first embodiment of the present invention.

The measurement results are shown in FIG. 3. This drawing also shows the results from a quartz resonator which is seal in a previous type of package that uses alumina as the principal material.

According to the drawing, it can be seen that the variation in resonant frequency caused by thermal treatment is held to approximately $\frac{1}{10}$ compared to the type of the conventional product in the case of the first embodiment composition, and is held to approximately $\frac{1}{15}$ in the case the eleventh embodiment composition.

Next, using a raw material composition indicated by another embodiment shown in Table 1, and following the same procedure as described above, quartz resonator packages were fabricated and quartz crystals mounted therein, and an investigation was performed to compare the dependency of resonant frequency of finished flat-package quartz resonator resonant frequency on the thermal treatment temperature with that of a type of the conventional product, the results obtained being approximately the same as those shown in FIG. 3 for the first embodiment and the eleventh embodiment (drawing not shown).

The present invention is not limited in application to a quartz resonator, but can also be applied to any electronic component making use of a quartz crystal.

Because the coefficients of thermal expansion of a piezo-electric component such as a quartz oscillator and that of the package thereof are matched, it is difficult for variations to occur in the frequency characteristics of the quartz resonator when the package is sealed and when heat treatment is done after sealing.

Additionally, it is possible to achieve a surface mount piezo-electric component which, because of improved bending resistance, has greater strength with respect to shock and bending force, and which, because of superior resistance to moisture, has high reliability.

Because no springy support is necessary for the purpose of absorbing the stress occurring when heat treating is done, it is possible to make the package thin and reduce the cost thereof.

Compared to an alumina package of the conventional product, a package which uses a glass-ceramic composite according to the present invention has a significantly reduced sintering temperature, in addition to being able to reduce the manufacturing cost, it is not necessary to use either a high-melting-point metal such as tungsten or molybden for the external electrodes or nickel or gold plating thereon, thereby achieving a reduction in cost.

TABLE 2

| Composition of Glass | PRESENT INVENTION EX.1 | PRESENT INVENTION EX. 9 | PRIOR ART |
| --- | --- | --- | --- |
| $SiO_2$ | 80 | 50 | 63 |
| $Al_2O_8$ | 0 | 30 | 3 |
| ZnO | 0 | | 1 |
| $B_2O_3$ | 0 | | 0 |
| RO | 0 | | 11 |
| $R_2O$ | 12 | 5 | 0 |
| $Na_2O$ | 0 | 5 | 22 |
| $P_2O_5$ | 8 | 10 | 0 |
| BaO | 0 | 0 | 0 |
| Ratio of Glass/forsterite | 50:50 | 50:50 | 50:50 |
| coefficients of thermal expansion | 129 | 135 | 118 |
| Bending resistance | 4500 | 3100 | 3200 |

What is claimed is:

1. A glass-ceramic composite comprising a crystallized glass component and a ceramic component, said ceramic component comprising 40 to 60% forsterite by weight, and the composition by percentage of weight of said crystallized glass being 70 to 86 of $SiO_2$ 1 to 10 of $P_2O_5$, 1 to 5 of MgO, and 8 to 22 of $R_2O$ (wherein R is at least one element selected from the group consisting of Li and K).

2. A glass-ceramic composite comprising a crystallized glass component and a ceramic component, said ceramic component comprising 40 to 60% forsterite by weight, and the composition by percentage of weight of said crystallized glass being 40 to 55 of $SiO_2$, 20 to 30 of $Al_2O_3$, 1 to 20 of $P_2O_5$, 1 to 5 of BaO, 1 to 10 of $Na_2O$ and 1 to 5 of $R_2O$ (wherein R is at least one element selected from the group consisting of Li and K).

3. A glass-ceramic composite according to claim 1, said composite being formed from a fine powder of said crystallized glass and said forsterite having a mean grain diameter of 0.1 to 3 μm.

4. A glass-ceramic composite according to claim 2, said composite being formed from a fine powder of said crystallized glass and said forsterite having a mean grain diameter of 0.1 to 3 μm.

* * * * *